United States Patent [19]

Shibuya et al.

[11] 3,963,056

[45] June 15, 1976

[54] CONCRETE PILES, POLES OR THE LIKE

[75] Inventors: Atsumi Shibuya, Tokyo; Chokichi Sugita, Niiza; Hiroshi Endo, Chiba, all of Japan

[73] Assignee: Nippon Concrete Kogyo Kabushiki Kaisha, Tokyo, Japan

[22] Filed: Jan. 2, 1974

[21] Appl. No.: 430,074

[52] U.S. Cl. .............................. 138/175; 138/176; 61/53; 61/56; 61/59
[51] Int. Cl.² .......................................... F16L 9/08
[58] Field of Search ............. 138/175, 176, DIG. 5; 52/223, 301, 659; 61/53, 56, 59

[56] References Cited
UNITED STATES PATENTS

| | | | |
|---|---|---|---|
| 922,480 | 5/1909 | Hodge | 138/175 X |
| 1,019,042 | 3/1912 | Gandersen | 61/53 |
| 1,683,108 | 9/1928 | Small | 61/53 |
| 2,035,217 | 3/1936 | Becker | 61/53 |
| 2,983,104 | 5/1961 | Bruns | 61/56 |
| 3,046,749 | 7/1962 | Blessey | 52/223 R X |
| 3,382,680 | 5/1968 | Takano | 61/56 |
| 3,501,881 | 3/1970 | Van Buren | 138/175 X |
| 3,602,000 | 8/1971 | Meheen | 61/56 X |

*Primary Examiner*—Richard E. Aegerter
*Assistant Examiner*—James E. Bryant, III
*Attorney, Agent, or Firm*—Oldham & Oldham Co.

[57] ABSTRACT

This invention relates to prestressed concrete piles, poles or the like pillers covered with an outer shell of steel pipe on a circumferential surface of a cylinderical prestressed concrete tube or a piller shaped prestressed concrete pole at least one end of said steel pipe being in an independent state to the concrete article. The invention provides the joint effects of the good compressive strength of the said prestressed concrete tube or pole and the good bending strength and a small frictional surface resistance of the steel pipe. One of the advantages of providing the steel pipe as the outer shell of the said prestressed concrete tube or pole relates to increasing the compressive strength of the said concrete tube or pole by preventing the generation of lateral stress within the said concrete tube or pole in a radial direction.

3 Claims, 5 Drawing Figures

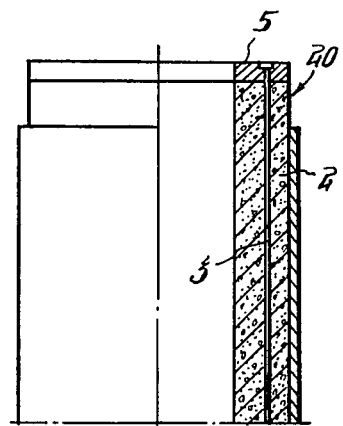
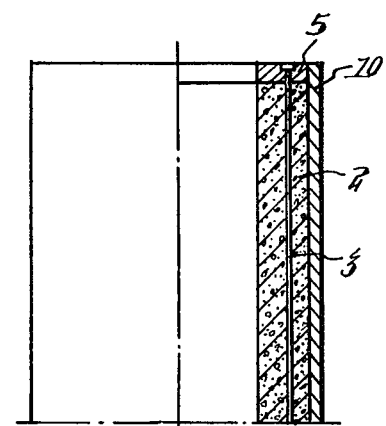
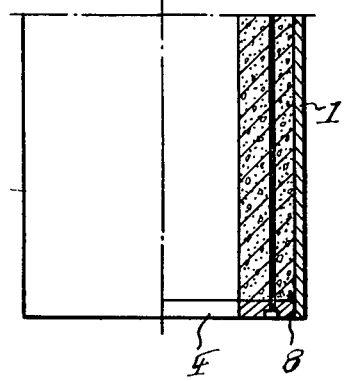
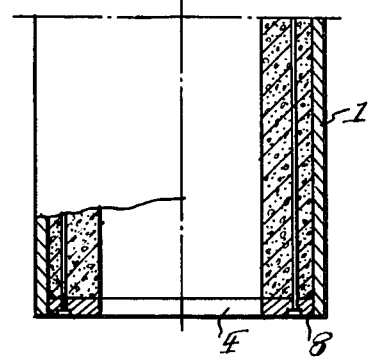
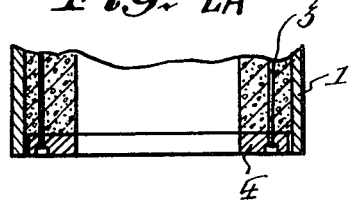

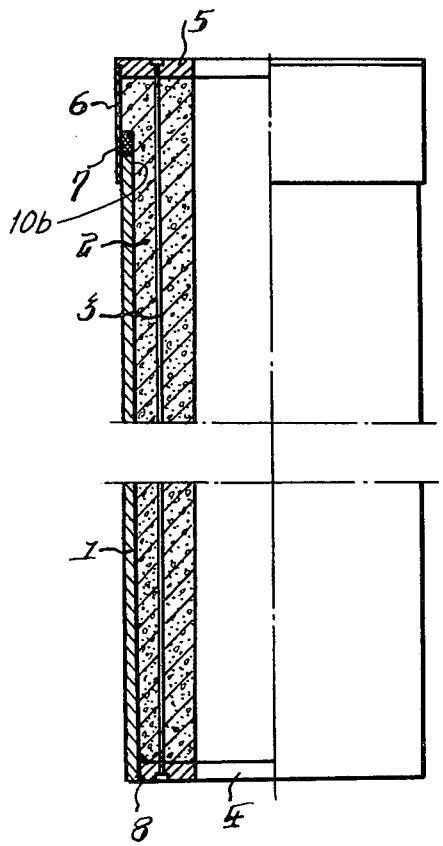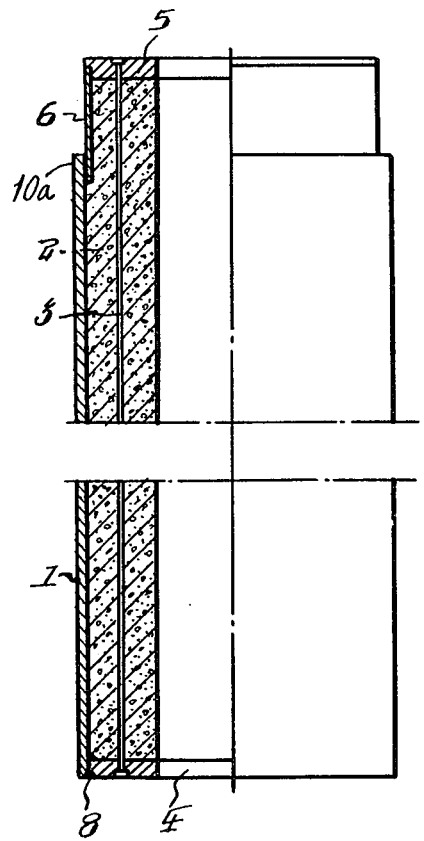

CONCRETE PILES, POLES OR THE LIKE

BACKGROUND AND SUMMARY OF THE INVENTION

This invention relates to an improvement of prestressed concrete piles, poles or the like pillars and particularly to providing the prestressed concrete piles, poles or the like pillars covered with an outer shell of a steel pipe on a circumferential surface of a cylinderical prestressed concrete tube or a piller shaped prestressed concrete pole which is a main part of the said prestressed concrete piles, poles or the like pillers so as to act a force upon the said piles, poles or the like pillers independently of the said concrete tube or pole, when force is given to the said piles, poles or the like pillers.

One of the objects of this invention is to provide prestressed concrete piles, poles or the like pillers in which compression force applied to the pillers acts on the tubular body of concrete itself whereas, bending moments of the prestressed concrete piles, etc. mainly works on the tubular steel plate covering the outer surface of the tubular concrete body. Another object of this invention is to provide the prestressed concrete piles, poles or the like pillers having a small frictional surface resistance same to that of the steel pipe when the said prestressed concrete piles, poles or the like pillers are pounded into the ground as fundamental piles.

Another object of this invention is to provide the prestressed concrete piles, poles or the like pillers having the increased compressive strength of the said prestressed concrete tube or pole preventing the generation of lateral stress within the said concrete tube or pole in a radial direction by providing the outer shell of the steel pipe on the circumferential surface of the said concrete tube or pole.

The further object of this invention is to provide prestressed concrete piles, poles or the like pillers having a larger bending resistance by arranging plural axial reinforcing steel wires suffering the bending stress nearer to the circumference of the concrete tube or pole than those of the prior prestressed concrete piles, poles or the like pillers.

BRIEF DESCRIPTION OF THE DRAWING

For a better understanding of this invention and to show how the same may be carried into effect, reference will now be made, by way of example, to the accompanying drawings in which, FIG. 1 is a longitudinal cross-sectional view in a right hand half section of the prestressed concrete piles providing an outer shell of steel pipe shorter than the prestressed concrete tube in length whereby the free upper end of the said steel pipe is independently positioned on the circumferential surface of the said concrete tube.

FIG. 2 is a longitudinal cross-sectional view of a modified prestressed concrete pile in which a lower end of the outer shell of the steel pipe is welded to a rim of a lower end plate fixing axial reinforcing steel wires thereon which are buried into the concrete wall of the said concrete tube in the stretched state, while an upper end of the outer shell of the steel pipe is in an independent state to an upper end plate and reaches to a level of the outer surface of the said upper end plate.

FIG. 2A is a partial longitudinal cross-sectional view of another modified prestressed concrete pile providing the outer-shell of the steel pipe on the circumferential surface of the prestressed concrete tube in which both ends of the steel pipe are in an independent state to both end plates and reach to the level of the outer surface of the said both end plates respectively.

FIG. 3 is a longitudinal cross-sectional half side view of the another modified prestressed concrete pile as shown in FIG. 1 in which the uncovered portion of the prestressed concrete tube is covered with a short cylinderical iron plate welded to the rim of one of the two end plates positioned on the ends of the prestressed concrete pile so as to overlap the outer surface of the end portion of the said cylinderical iron plate with the inner surface near to the free end of the said steel pipe.

FIG. 4 is a longitudinal cross-sectional half side view of another modified prestressed concrete pile as shown in FIG. 3 in which the uncovered portion of the circumferential surface of the said prestressed concrete tube is covered with the short cylinderical iron plate so as to overlap the inner surface of the end portion of the cylinderical iron plate with the outer surface near to the free end of the said steel pipe.

DESCRIPTION OF THE PREFERRED EMBODIMENTS

Referring to the drawings and particularly to FIG. 1 and the cylindrical concrete tube 2, the major length of the prestressed concrete pile is covered with the steel pipe 1 so as to intimately contact the circumferential surface of the said concrete tube 2 with the inner surface of the steel pipe 1. An end of the steel pipe 1 is jointed to the rim of one of the two end plates 4, 5 at 8 the lower end of the steel pipe 1 as shown in the lower side of the FIG. 1 so as to be level with the bottom of the annular iron end plate 4 and the lower end of the steel pipe 1 by means of, for example, welding. Plural axial reinforcements consisting of the steel wires 3 are arranged and buried in the stretched state, into the wall of the concrete tube 2 lying between the said end plates 4, 5 of the same size and shape on the both ends of the said prestressed concrete piles thereby producing the prestress within the cylinderical wall of the concrete tube 2. The said plural axial reinforcements may be arranged and buried in the stretched state, into the wall of the said concrete tube 2 nearer to its circumference than those of the prior prestressed concrete piles to give an increased bending resistance to the prestressed concrete piles of this invention. The said stretched steel wires 3 are anchored to the said end plates 4 and 5 by means of enlarged portions or threaded nuts provided on the both ends of the said steel wires 3. Tensioning of the steel wires 3 is effected by a well-known means. Although the inner surface of the steel pipe 1 is intimately contacted with the outer circumferential surface of the said concrete tube 2, the length of the steel pipe 1 as shown in the upper side of the FIG. 1 is shorter than that of the cylinderical concrete tube 2 whereby the upper end of the steel pipe 1 is positioned on the outer circumferential surface of the cylinderical concrete tube 2 near to the upper end thereof and the uncovered portion 20 of the said concrete tube 2 remains on the upper end portion of the circumferential surface of the cylinderical concrete tube 2.

In detail, the upper end of the steel pipe 1 covering the circumferential surface of the cylinderical concrete tube 2 is free to move with relation to the circumferential surface of the said concrete tube 2 as well as to the upper end plate 5 on the upper end of the concrete piles so that the driving force acting on the upper end of the said concrete piles in a driving work and a supporting weight transmit to the cylinderical concrete tube 2 but do not transmit to the steel pipe 1.

Therefore the said concrete piles possess the characteristic features of resisting compression by the concrete and of fully utilizing the strength of the steel pipe 1, since the steel pipe 1 is able to resist bending stress and is free of any compression in the axial direction.

In the concrete piles as shown in the FIG. 2, (upper side of FIG. 2), an unattached or free end 10 of the steel pipe 1 reaches to the level of the outer surface of the annular iron end plate 5 on the upper end of the concrete piles but is in the independent state to the said end plate 5 so as to permit the upper end of the said steel pipe 1 to axially move independent of the rim of the said end plate 5, while the annular iron end plate 4 on the lower end of the concrete piles is welded to the inner surface of the steel pipe 1 at the lower end 8 thereof and the cylinderical concrete tube 2 is prestressed by the steel wires 3 as shown in the FIG. 1. In the concrete piles of the FIG. 2A, lower end of the steel pipe 1 is in the independent state to the rim of the annular iron end plate 4 same to the said end plate 5 as shown in the upper side of the FIG. 2.

In the concrete piles of the FIG. 3, the short cylinderical iron plate 6 is welded to the rim of the annular iron end plate 5 which is in the independent state to the steel pipe 1 so as to cover the uncovered portion 20 of the circumferential surface of the cylinderical concrete tube 2 and also to overlap the inner surface near to a free end 10a of the steel pipe 1 with the outer surface near to the lower end of the said cylinderical iron plate 6. The another portion of the said concrete piles except the above mentioned structure of the said concrete piles and the characteristic feature thereof are similar to those of the FIGS. 1 and 2.

In the concrete piles as shown in the FIG. 4, the said uncovered portion 20 of the cylinderical concrete tube 2 is covered with the short cylinderical iron plate 6 corresponding to that of the FIG. 3 so as to overlap the inner surface of the end portion of the said iron plate 6 with the outer surface near to a free end 10b of the steel pipe 1. In detail, the diameter of the annular iron end plate 5 is larger than that of the FIG. 3 by twice of the thickness of the steel pipe 1. The cylinderical iron plate 6 having the equivalent inner diameter to that of the said annular iron end plate 5 is welded to the rim of the annular iron end plate 5.

A ring packing 7 of a soft material as shown in the FIG. 4 is disposed on the free end 10b of the steel pipe 1 whereby the strike force applied to the cylinderical concrete tube 2 is prevented from transmitting to the free end of the steel pipe 1 by the buffer action of the said packing. The said ring packing 7 may be omitted optionally.

The joint effect obtainable from the steel pipe 1 and the prestressed cylinderical concrete tube 2 are the same to those of the FIGS. 1 - 3. Although this invention has been explained as to the prestressed concrete piles as shown in the FIGS. 1 - 4, this invention is not limited to the said concrete piles but comprises the concrete poles or the like pillers. It will be easily understood that the piller shaped prestressed solid concrete pole is usable in the same way as the said prestressed cylinderical concrete tube which is the main part of the prestressed concrete piles of this invention.

It will be seen that one end of the tubular steel plate 1 covering the outer surface of said tubular concrete body 2 is free from said tubular concrete body so that, driving force applied to the end of said piles, etc. does not directly work on the tubular steel plate, namely, the tubular steel plate is not subjected to compression forces but to bending moments of said piles, etc.

What is claimed is:

1. Prestressed concrete piles, poles, or the like pillers comprising a tubular body of concrete having an outer surface and a cylindrical periphery, a pair of annular iron discs arranged at opposite ends of said concrete body, reinforcing pretensioned steel wires extending longitudinally through said concrete body and between said annular iron discs, a tubular steel plate covering the outer surface of said concrete body and having first and second ends, said tubular steel plate being welded at said first end thereof to one of said annular iron discs, whereas said second end of said tubular steel plate is free to move in relation to said concrete body, said tubular steel plate being shorter than said body of concrete and terminating in an unattached free end portion, said tubular steel plate covering the outer surface of said concrete body for a major portion of the length thereof, a second tubular steel plate covering a short remaining portion of the outer surface of said concrete body and being welded at one end thereof to the other of said iron discs, a second end of said second tubular steel plate overlapping the free end portion of said tubular steel plate.

2. Prestressed concrete piles, poles or the like pillers comprising a tubular body of concrete having an outer surface, a pair of annular iron discs arranged at opposite ends of said tubular concrete body, reinforcing pretensioned steel wires extending between said annular iron discs longitudinally through said tubular concrete body, a tubular steel plate (1) covering a major portion of the outer surface of said tubular concrete body and having first and second ends, said tubular steel plate (1) being secured at said first end thereof to one of said annular iron discs, said tubular steel plate terminating at its second end short of a second one of said annular iron discs and forming a free end portion, another tubular steel plate (6) covering a small remaining portion of said outer surface of tubular concrete body and being secured at one end thereof to the other of said annular iron discs, a second end of said another tubular steel plate (6) overlapping the free end portion of said tubular steel plate (1).

3. Prestressed concrete piles, poles or the like pillers as claimed in claim 2 in which an annular packing 7 of soft material is fitted within an inner wall of said another tubular steel plate 6, said annular packing being engaged with said second end of said tubular steel plate 1 thereby absorbing shock produced by driving force applied to an end of said pile, pole or the like pillers.

* * * * *